(12) United States Patent
Burnham

(10) Patent No.: US 7,051,477 B2
(45) Date of Patent: May 30, 2006

(54) LAWN EDGING

(76) Inventor: Keith Burnham, 55 Chadstone, Castle Ashby, Northamptonshire NN7 1LH (GB)

( * ) Notice: Subject to any disclaimer, the term of this patent is extended or adjusted under 35 U.S.C. 154(b) by 108 days.

(21) Appl. No.: 10/176,309

(22) Filed: Jun. 20, 2002

(65) Prior Publication Data

US 2003/0000135 A1  Jan. 2, 2003

(30) Foreign Application Priority Data

| Jun. 26, 2001 | (GB) | ................... 0115550.6 |
| Aug. 16, 2001 | (GB) | ................... 0119954.6 |
| Sep. 27, 2001 | (GB) | ................... 0123249.5 |

(51) Int. Cl.
*E01C 11/22* (2006.01)

(52) U.S. Cl. .............. 47/33; 404/7; D25/164
(58) Field of Classification Search ............... 248/300, 248/909; 47/33, 25; 52/102, 604; D25/164; 404/7

See application file for complete search history.

(56) References Cited

U.S. PATENT DOCUMENTS

| 670,001 | A | * | 3/1901 | Morss ........................ 404/2 |
| 3,777,421 | A | * | 12/1973 | Bomba et al. ................. 47/33 |
| 3,788,001 | A | | 1/1974 | Balfanz ........................ 47/33 |
| 3,933,311 | A | * | 1/1976 | Lemelson ................... 239/276 |
| 4,349,596 | A | * | 9/1982 | Hendrix ........................ 47/33 |
| 4,483,501 | A | * | 11/1984 | Eddy ........................ 248/205.1 |
| 4,863,307 | A | * | 9/1989 | Jones .......................... 404/7 |
| 5,040,316 | A | * | 8/1991 | Fast ......................... 40/124.4 |
| 5,092,076 | A | * | 3/1992 | Terreta ....................... 47/33 |
| 5,377,447 | A | * | 1/1995 | Fritch ......................... 47/33 |
| 5,379,546 | A | * | 1/1995 | Popp .......................... 47/33 |
| 5,421,118 | A | * | 6/1995 | Bauer ......................... 47/33 |
| 5,544,445 | A | * | 8/1996 | Mantilla ...................... 47/33 |
| D378,857 | S | * | 4/1997 | Hale ........................ D25/164 |
| 5,640,801 | A | * | 6/1997 | Rynberk ....................... 47/33 |
| 5,857,288 | A | * | 1/1999 | Wiste .......................... 47/33 |
| D424,714 | S | * | 5/2000 | Hale ........................ D25/164 |
| 6,085,458 | A | * | 7/2000 | Gau ............................ 47/33 |
| 6,099,201 | A | * | 8/2000 | Abbrancati ................... 404/7 |
| D448,498 | S | * | 9/2001 | Hulett ...................... D25/164 |
| 6,324,783 | B1 | * | 12/2001 | McIntyre et al. .............. 47/33 |
| 6,327,815 | B1 | * | 12/2001 | Becton et al. ................ 47/33 |
| 6,379,078 | B1 | * | 4/2002 | Zwie .......................... 47/33 |
| 6,385,898 | B1 | * | 5/2002 | Noel ........................... 47/33 |
| 6,485,226 | B1 | * | 11/2002 | Harger ........................ 404/7 |
| 6,568,126 | B1 | * | 5/2003 | Womack ....................... 47/33 |
| 6,625,925 | B1 | * | 9/2003 | Foster ......................... 47/33 |

FOREIGN PATENT DOCUMENTS

| DE | 298 19 116 | 1/2000 |
| FR | 2 773 303 | 7/1999 |

* cited by examiner

*Primary Examiner*—Anita M. King
(74) *Attorney, Agent, or Firm*—Heslin Rothenberg Farley & Mesiti P.C.

(57) ABSTRACT

An edge support for a margin of a lawn comprises an elongate generally L-shaped support member having a base part fixable to ground beneath the lawn, and an upstanding wall part to retain an edge of the lawn. The base part has elongate apertures to allow grass roots to grow therethrough. The base part may have several zones at which it may be cut or broken to permit bending of the wall part. The edge support may be provided with connectors to connect it to further edge supports via flanges on the wall part and the base part.

21 Claims, 4 Drawing Sheets

LAWN EDGING

BACKGROUND OF THE INVENTION

1. Field of the Invention

The present invention relates to a device for producing a neat edge for lawns, borders, garden paths and the like. More particularly, but not exclusively, it relates to a device to demarcate and support an edge of a lawn, and to a method for using such a device.

2. Background Art

Creating a lawn with a neat edge where it meets flower beds, borders, paths, ponds and the like can be difficult. There is a risk that the edge of the lawn may crumble, especially if the turf is not very well knitted together. If a damaged edge is trimmed back to shape, for example with a spade or an edging tool, the lawn inevitably shrinks and the bed, path, etc. widens. Damaged sections may even need to be removed and re-turfed.

A particular problem may arise in the case of garden ponds, where the surrounding turf can easily be damaged or even undermined. Clods of soil falling into a pond can make the water unacceptably muddy, necessitating frequent cleaning. It is not always a satisfactory solution to pave the immediate surrounds of a pond.

It would be helpful to provide a barrier to discourage the spread of grass from the lawn into beds, borders and paths, particularly when regular weeding would be inconvenient or impracticable.

Simple lawn edging materials, such as vertically inserted ceramic tiles or metal strips, are well known. However, if the lawn is lower than the bed or vertical edge, mowing becomes difficult, and if only one side of the edging material is supported, such as where the lawn is higher than adjacent portions of a flower bed, or where the lawn borders on a pond, the edging material can easily fall over. It may be attached to posts, stakes and the like, extending deep into the ground, but these can be unsightly and are not compatible with waterproof membranes such as are used to line garden ponds.

Substantial graveled areas are becoming increasingly popular as an alternative to traditional grassed lawns. However, for graveled areas as well as grassed ones, a neat edge can be difficult to produce and maintain, particularly when the graveled area is higher than a neighboring area, and there is a risk of gravel falling or being kicked, say, into the neighboring area. There are hence problems with edging graveled areas akin to those with edging traditional grassed lawns, particularly when it is desired that a graveled area extends up to a pond. The term "lawn" as used herein should therefore be understood to refer to both traditional grassed lawns and to graveled garden areas, except where clearly restricted to one or the other by context.

BRIEF SUMMARY OF THE INVENTION

It is therefore an object of the present invention to provide a means to support and protect a periphery of a lawn, particularly adjacent a pond, bed or border, which obviates the above problems and permits the creation of a neat and durable edge to the lawn. It is a further object of the present invention to provide a method for protecting an edge of a lawn using such means.

According to a first aspect of the invention, there is provided an edge support means for a margin of a lawn as defined herein, comprising an elongate generally L-shaped support member having a base part adapted to be fixable to ground beneath the lawn, and an upstanding wall part adapted to retain an edge of the lawn.

The base part may be apertured, to allow grass root growth therethrough.

Preferably, the base part comprises a lattice of strut means joining the wall part to an elongate member, optionally extending parallel to the wall part.

The lattice may define a plurality of elongate apertures extending substantially between the wall part and the elongate member.

Said elongate apertures may comprise at least one third of a total area of the base part.

The elongate apertures may each extend transversely to the wall part.

Each elongate aperture may have a smooth rounded periphery.

The base part, preferably the elongate member, may be provided with anchoring means.

The anchoring means may comprise peg means adapted to cooperate with apertures in or adjacent to the elongate member.

The wall part may optionally extend downwardly from the plane of the base part so that the edge support has a T-shaped profile.

The elongate member may be provided with a plurality of severable zones, anyone of which may be cut or broken as required to permit alteration, at any desired point, of the alignment of the wall part.

The wall part may thus be deformable, either convexly or concavely.

The wall part may comprise zones of weakness, better to allow its bending.

The edge support means may be provided with connection means to connect it to further edge support means.

The wall part may be provided along its upper margin with strengthening means, such as a zone of increased thickness or a flange means, optionally a flange means extending towards the base part.

The base part may be provided along its margin remote from the wall means with strengthening means, such as a zone of increased thickness or a flange means, optionally a flange means extending towards the wall part.

The connection means may conveniently connect via flange means of adjoining edge support means.

The edge support means may be provided adjacent a junction of the wall part and the base part with reinforcing means adapted to resist flexion of said junction, particularly bending of the wall part away from the base part.

The reinforcing means may comprise a simple reinforcing bead extending along the junction or more complex shapes, such as a C-shaped bead, disposed with a convex side towards said junction.

The edge support means may comprise a plastics material, such as polyethylene, polypropylene or poly (vinyl chloride).

The edge support means may be provided with illumination means.

The illumination means may comprise fiber-optic cable means operatively linked to a light source locatable remotely from the edge support means.

The edge support means may comprise a fiber-optic cable element provided with means to connect it operatively to a fiber-optic cable element of adjoining edge support means.

The edge support means may thus illuminate a margin of a lawn, path, pond or the like, for safety or for decorative purposes.

According to a second aspect of the present invention, there is provided a method of protecting an edge of a lawn which comprises the steps of providing an edge support means as described above, locating the base part thereof to a ground surface, and laying lawn material on top of the base part with an end of the lawn material abutting the wall part.

When the lawn is a grassed lawn, the lawn material may comprise turf, which may be a freshly laid turf or alternatively may be a peripheral zone of an existing lawn.

Alternatively, where the lawn is a graveled area, the lawn material may be gravel.

The method may comprise the step of removing existing turf or other lawn material from the lawn over at least an area corresponding to an extent of the base part.

Alternatively, the method may comprise the step of peeling back existing turf from said area.

The method may comprise the step of anchoring the edge support means to the ground using a peg means or other anchoring means.

The method may further comprise the steps of providing a plurality of edge support means, and linking them in series, either before or after disposing them in position on the ground.

To protect an edge of a lawn adjacent a pond, the method may further comprise the steps of digging the pond and laying a waterproof lining means over a base of the pond and a surface of the ground surrounding the pond, and the base part of the or each edge support means is then disposed on top of said waterproof lining means, and the turf or other lawn material is laid on top of both the base part and the waterproof lining means.

BRIEF DESCRIPTION OF THE DRAWINGS

Embodiments of the invention will now be more particularly described by way of example and with reference to the accompanying drawings, in which.

DETAILED DESCRIPTION

Figure 1:
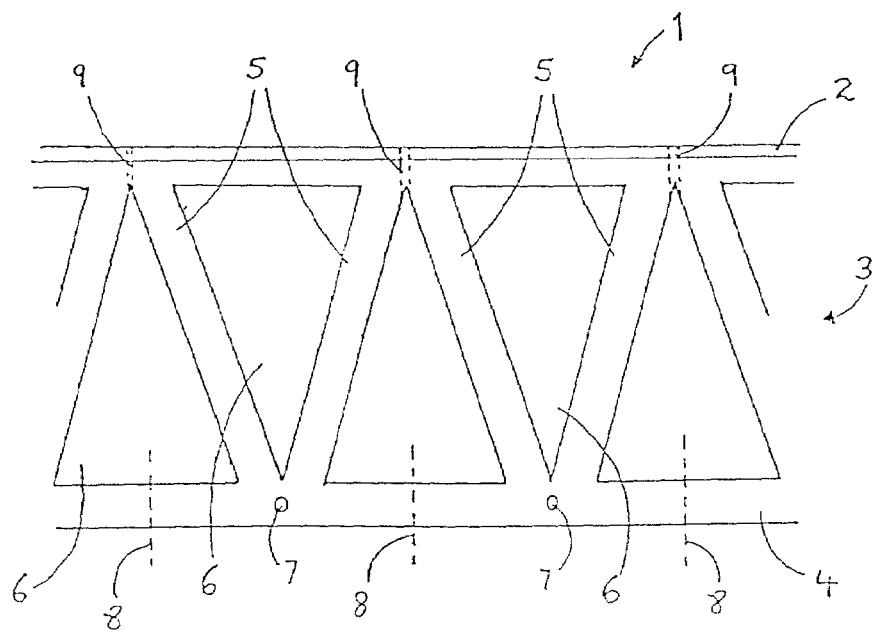
FIG. 1 is a plan view of part of an edge support embodying the invention.

Referring now to the drawings, and to FIG. 1 in particular, an edge support 1 for a lawn comprises a generally vertical, in use, wall 2 and a generally horizontal, in use, base member 3. In the embodiment shown, the wall 2 and the base member 3 comprise a single L-shaped molding of thermoplastics material, although in an alternative embodiment, the wall 2 and the base member 3 are formed separately and fastened together. In other embodiments, the support may comprise other materials such as wood or metal, especially aluminum.

The base member 3 comprises an elongate strip 4 and a plurality of diagonal strips 5 connecting it to the wall 2. The diagonal strips 5 slant in alternately opposing directions to form a series of triangular apertures 6. This configuration imparts excellent rigidity to the base member 3, while saving raw materials and allowing grass roots to grow down through the base member 3, helping to anchor it in place. The strip 4 is provided with a plurality of holes 7, spaced one from another, each configured to receive a peg (not shown in this view) to help to anchor the edge support 1.

The edge support 1 may be used in the configuration shown in FIG. 1 to support a straight lawn edge. To support a concave or convex lawn edge, the frame strip 4 is severed along any or each of dotted lines 8. The wall 2 may then be folded concavely or convexly. In the wall 2, at the apex of each triangular space, a fold zone 9 may optionally be provided to allow bending of the wall 2. However, this may not be necessary, especially with lighter gauge material. The severed ends of the strip 4 may be overlapped where necessary.

The strip 4 may be grooved, notched or otherwise weakened along the dotted lines 8, to ease cutting. Similarly, each fold zone 9 may be grooved, notched or otherwise prepared for easy folding. However, in a preferred embodiment, both the wall 2 and the base member 3 are composed of thermoplastics material of thickness two to three millimeters, which may be folded manually without especial preparation. Similarly, the strip 4 may then be cut at any convenient point along its length with readily available tools, such as a knife, scissors, garden shears, secateurs or the like.

Figure 2:
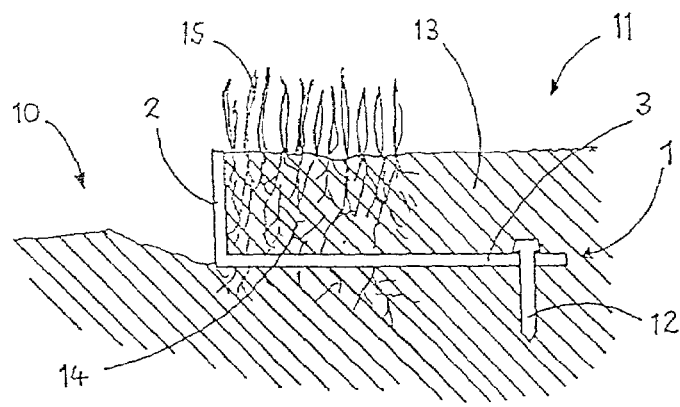
FIG. 2 is a cross-sectional view of the support of FIG. 1 in use.

In use, the edge support 1 is disposed as shown in FIG. 2. When a grassed lawn is being laid from scratch, the edge support 1 is placed, with the base member 3 on a generally level surface, at a boundary between, for example, a flower bed 10 and an area 11 which is or will be lawn. A peg 12 is inserted through each hole 7 of the base member 3. A turf 13 is then laid on top of the base member 3, such that an end of the turf 13 is in contact with the wall 2. The remainder of the area 11 may be turfed conventionally.

If a lawn is being grown from seed, soil is placed on top of the base member 3 and in contact with the wall 2, and the area 11 may then be seeded conventionally.

If the edge support 1 is to be used to edge an existing grassed lawn, a turf 13 is either cut out of the existing area 11, or a corresponding zone is undercut and peeled back. In either case, sufficient space is created to emplace the edge support as above, and the turf 13 is then replaced or folded back into position, as appropriate. Any gaps remaining between the turf 13 and the wall 2, due, for example, to previous damage to the edge of the lawn area 11, can be filled with soil and reseeded, or plugged with small pieces of turf, as desired.

The wall 2 of the edge support 1 thus creates a neat edge to the lawn, resistant to crumbling and other damage. The weight of the turf 13 on the base member 3, and the presence of the pegs 12, keep the edge support 1 securely in position. In a preferred embodiment, the wall 2 is dimensioned to be almost as high as a typical turf thickness (normally from twenty to twenty-five millimeters). The wall 2 may thus conveniently be about 20 millimeters high. The lawn area 11 can then be mown right up to its edge, which is supported by the wall 2, without the wall 2 being damaged by lawnmower blades, or vice versa. Edge trimming, with shears or a string trimmer, for example, may be unnecessary. Roots 14 of grass plants 15 growing on the turf 13 (only some of which are shown, for clarity) may in time grow through the apertures 6 in the base member 3, anchoring the edge support even more securely. In this connection, the apertures are shown as triangles. However, other shapes may be used, as described below.

In normal use, it is envisaged that the base member 3 should extend perhaps 70 to 80 millimeters from the wall 2, to provide sufficient stability. In an alternative embodiment, larger edge supports 1 may be provided, with a turf 13 already in situ thereon, for convenience.

Figure 12:
FIG. 12 is a cross-sectional view of a connecting member.

Clearly, edge supports 1 may be provided with walls of a convenient length, and a number of walls may be connected, end-to-end, to provide a desired continuous length of wall 2. Standard male-female engagement devices may be provided at each end of each length, and one embodiment of such a connector is shown in FIG. 12, described in more detail below.

Figure 3:
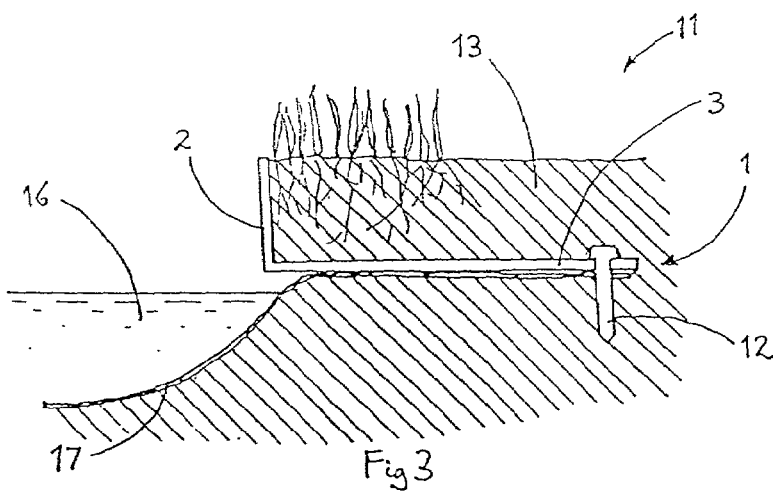
FIG. 3 is a cross-sectional view of the support of FIG. 1 in use adjacent a pond.

For the edge support 1 to be used adjacent a pond 16, there is a slight variation in the installation method. A pit is dug for the pond 16, and the pond 16 is lined with a water impermeable membrane 17, which is extended to underlie the area 11. The base member 3 is then placed on top of the membrane 17 as shown in FIG. 3. The pegs 12 are set far enough from the edge of the pond to be able to penetrate the membrane 17 without possibility of leakage. Such a perforation in a periphery of the membrane 17 would not cause the leakage problems that could result from the use of retaining stakes at a margin of the pond 16 itself. For a grassed lawn, the turf 13 may then be placed on top of the base member 3 and in contact with the wall 2, as described above.

A neat and secure edge can thus be provided for a pond in a lawn area, without recourse to concrete rims, paving slabs and the like. There will be very little tendency for soil to crumble into the pond, and the lawn can be mown up to its edge without its giving way.

Figure 4:
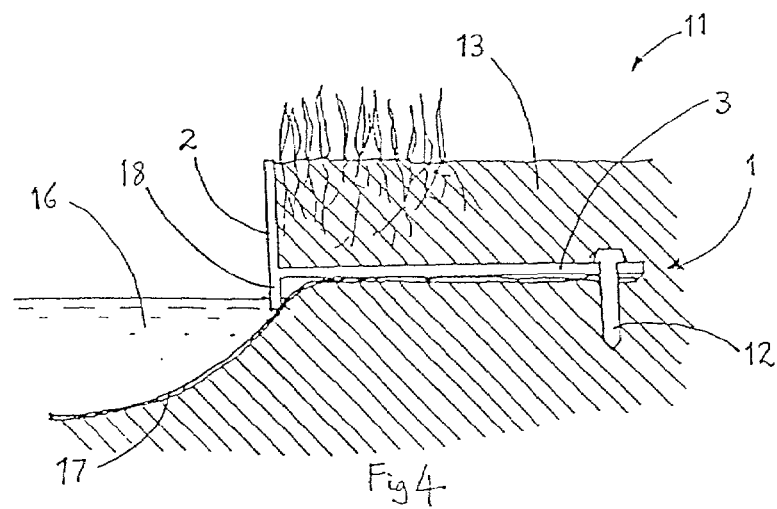
FIG. 4 is a cross-sectional view of an alternative form of edge support in use adjacent a pond.

In this application of the edge support 1, a short downward extension 18 of the wall 2, below the general level of the base member 3, may form a sideways 'T'-shaped support. This is useful for cosmetic and other purposes, as shown in FIG. 4.

The edge support 1 may be made of appropriately colored materials, such as green plastics material, and may have appropriate surface textures molded or embossed into a face of the wall 2 exposed in use, to blend in with its surroundings.

Figure 5:
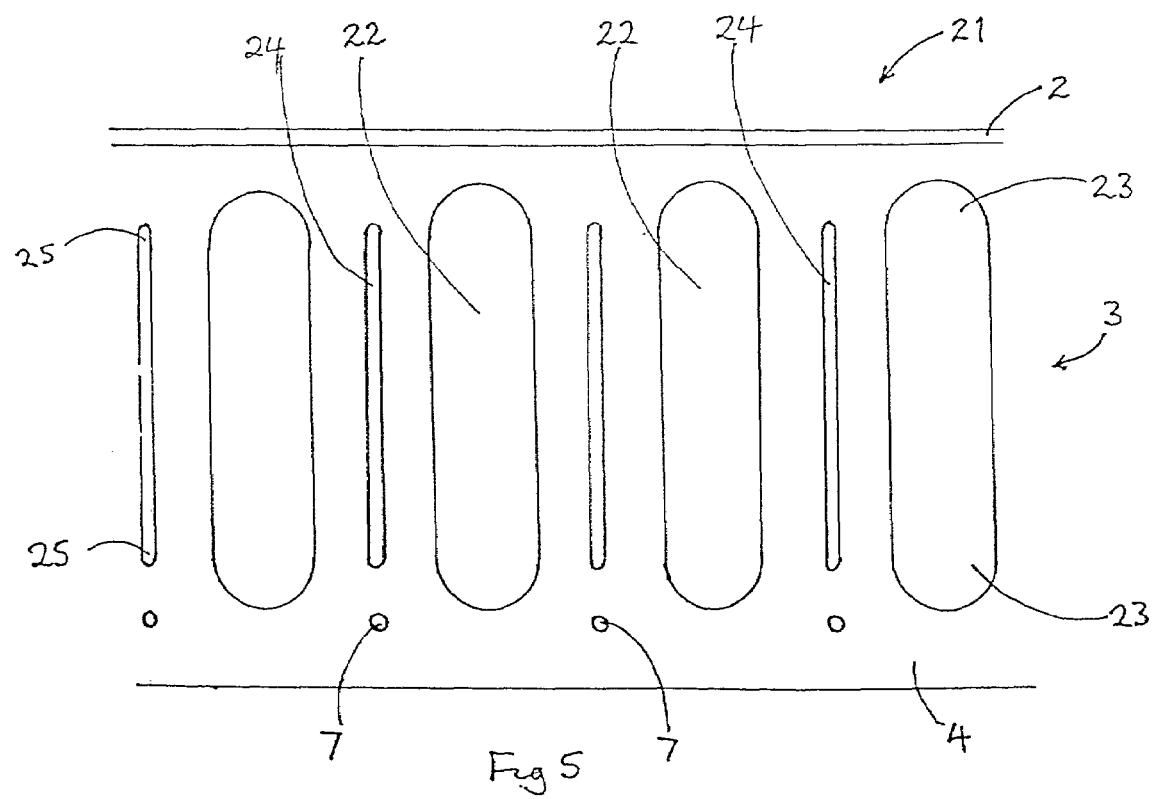
FIG. 5 is a plan view of part of another edge support embodying the invention.

FIG. 5 shows a plan of an edge support 21 with an alternative configuration of base member 3 to that shown in FIG. 1. The wall 2 and the base member 3 comprise a single L shaped extrusion of thermoplastics material. The base member 3 is provided with a plurality of elongate apertures 22, which may be formed by stamping out portions of the base member 3 (which is typically only two or three millimeters thick). Each end 23 of the elongate apertures 22 is rounded, conveniently being substantially semicircular. This shape reduces stresses in the material of the base member 3 around the elongate apertures 22, compared to shapes with distinct corners, reducing accidental breakages. The elongate apertures 22 extend generally perpendicularly away from the wall 2 towards an elongate strip 4 defining an edge of the base member 3 remote from the wall 2. The strip 4 is provided with a plurality of holes 7, each configured to receive a peg, as for the edge support 1 of FIG. 1.

To support a concave or convex lawn edge, the elongate strip 4 is severed along a line between its edge remote from the wall 2 and an elongate aperture 22. The wall 2 may then be folded concavely or convexly, as for the edge support 1 of FIG. 1, overlapping severed ends of the strip 4 where necessary.

A plurality of narrow slots 24 are also provided in the base member 3, also with rounded ends 25. The narrow slots 24 supplement the elongate apertures 22, lightening the edge support 21 further, and providing additional routes through which grass roots may grow and engage with the base member 3, anchoring the edge support 21.

In an alternative embodiment of the invention, the base member 3 is an unapertured sheet. Alternatively, the base 3 may be provided with slits or notches, extending from the wall 2 towards an opposite margin of the base member 3, to facilitate bending of the wall 2.

Figure 6:
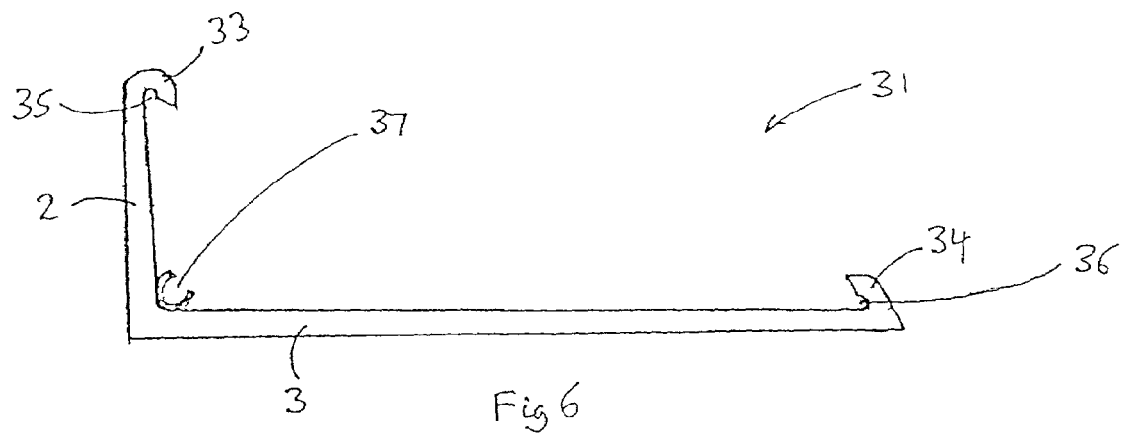
FIG. 6 is a cross-sectional view of a further edge support with strengthening elements.
Figure 7:
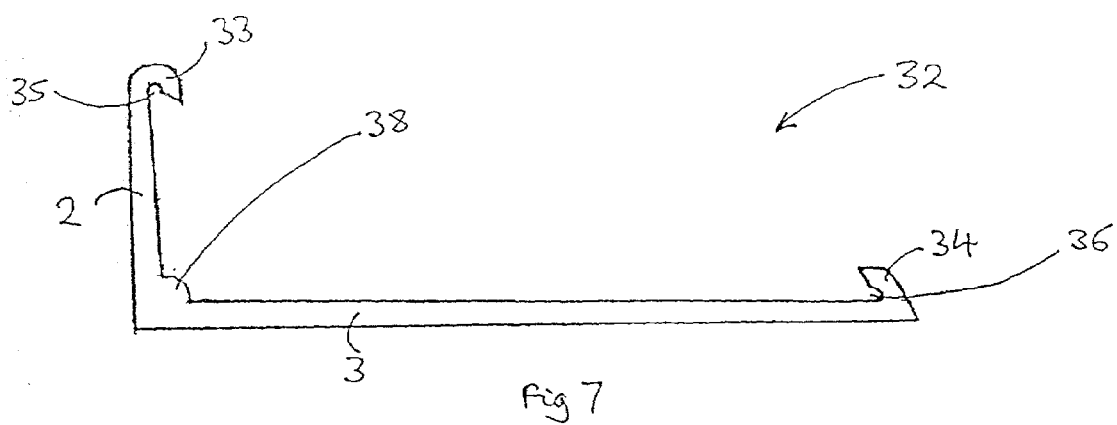
FIG. 7 is a cross-sectional view of a variant form of the support of FIG. 6.

FIGS. 6 and 7 show, in cross-section, edge supports 31,32 with strengthening elements. The wall 2 of each edge support 31,32 has its upper rim 33 folded over. This strengthens the upper rim 33 without making the wall 2 much more difficult to bend convexly or concavely, as described above.

The base member 3 of each edge support 31,32 is provided adjacent its edge remote from the wall 2 with a flange 34 extending therefrom upwardly and slightly towards the wall 2. This strengthens the base member 3 and may engage with a turf 13 (not shown) placed thereon, helping to anchor the edge support 31,32. It does not make the base member 3 significantly more difficult to sever, where required.

The folded upper rim 33 and the flange 34 are simple shapes to be formed in a continuous plastics extrusion (which may be cut into individual edge supports as required). The recesses 35,36 formed between the upper rim 33 and the wall 2, and between the flange 34 and the base member 3, respectively, providing convenient points of attachment for connecting elements 39 to join adjacent edge supports.

The edge support 31 of FIG. 6 is provided with a reinforcing element 37 with a C-shaped profile adjacent a junction of the wall 2 and the base member 3. The edge support 32 of FIG. 7 is instead provided with a reinforcing bead 38 of generally quarter-circular profile along the junction. The reinforcing element 37 and the reinforcing bead 38 each strengthen the respective edge support 31,32 against any tendency for the wall 2 to be bent away from the base member 3, for example by someone treading on an edge of a lawn supported by the edge support.

Figure 9:
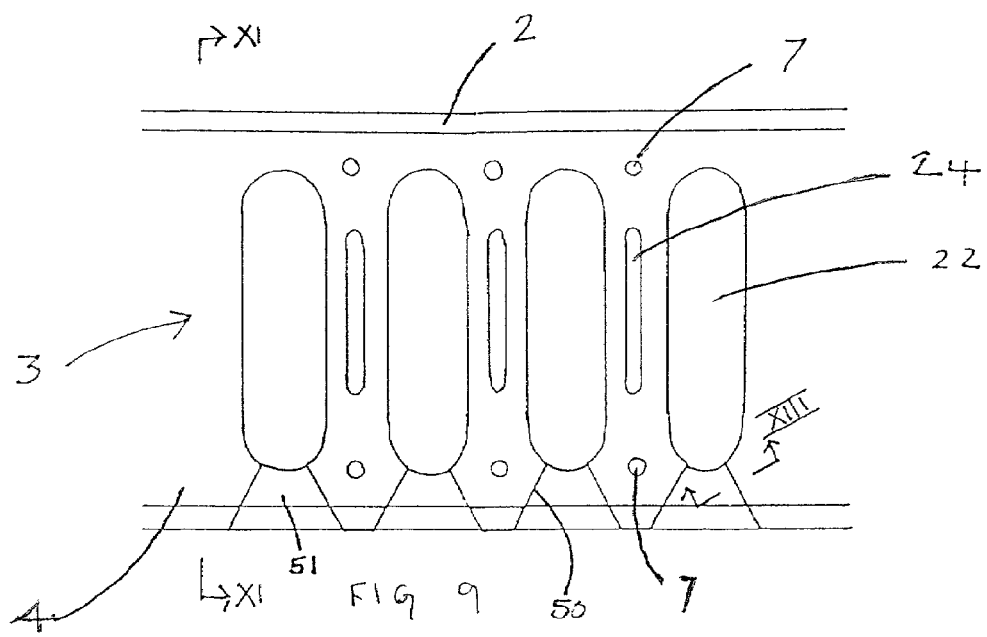
FIG. 9 is a plan view of a further embodiment of the invention.
Figure 10:
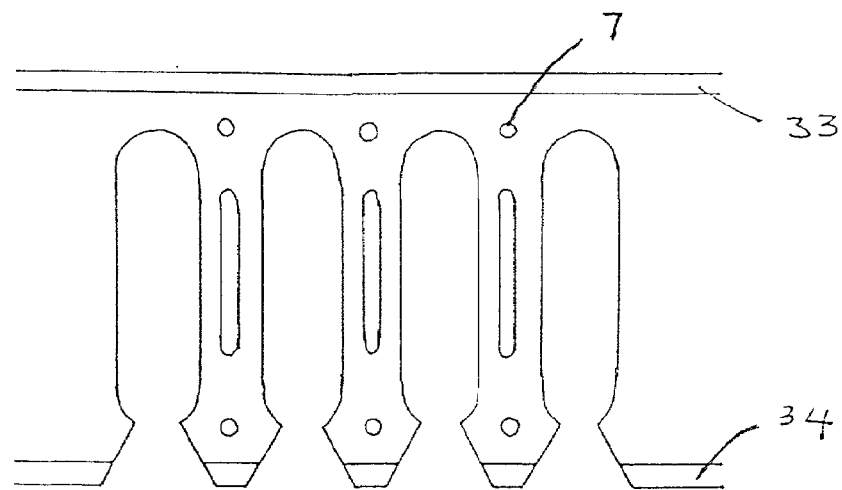
FIG. 10 is a plan view of the edge support of FIG. 9 with all the removable panels knocked out to allow flexure in either direction of the support.
Figure 11:
FIG. 11 is a cross-sectional view of the support of FIG. 9 taken along the line XI—XI thereof.

A preferred embodiment of the invention is shown in FIGS. 9 and 10. The base member 3 is apertured similarly to that of the preceding embodiment, but is additionally provided with zones of weakness 50, two of which lead from an edge of the base 3 at a converging angle across the frame strip 4 to connect to the rounded end 23 of each aperture 22, defining a removable panel 51 of generally trapezoidal shape.

Figure 13:
FIG. 13 is a scrap cross-sectional view showing a zone of weakness and taken along the line XIII of FIG. 9.

A cross section of such a zone of weakness 50 is shown in FIG. 13. It may easily be fractured by manual pressure to remove the panel 51, allowing the support to be bent in either direction. FIG. 10 shows a support where all the panels 51 have been removed. Of course, it is not always necessary to remove every panel. Where the degree of curvature required is shallow, alternate panels 51 may be left in place, and where no curvature is required, all the panels 51 in that section may remain unbroken. Essentially, any panel may be removed to allow curvature at that section of the edge support.

Figure 8:
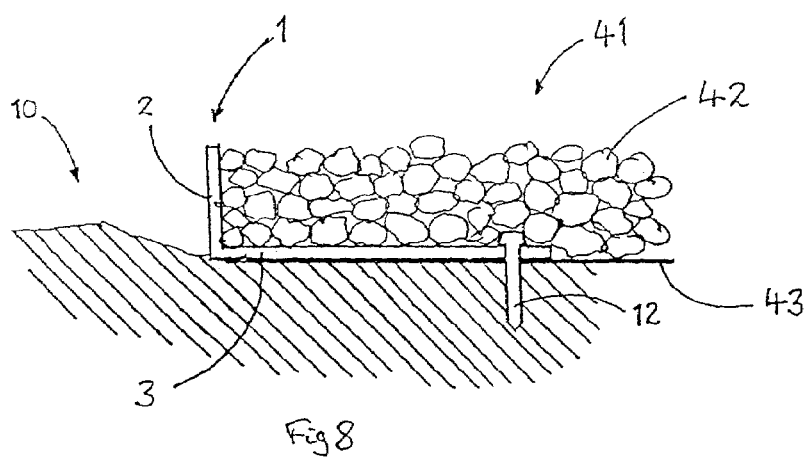
FIG. 8 is a cross-sectional view of the support of FIG. 1 in use with a graveled "lawn"

FIG. 8 shows an edge support 1 supporting an edge of a graveled "lawn" 41 adjacent a flowerbed 10. The base member 3 is placed on a generally level surface, as for a grassed lawn, and a peg 12 is inserted through each hole 7 of the base member 3. Gravel 42 is then poured on top of the base member 3, and is retained by the wall 2, restraining it from spilling on to the flowerbed 10. In this use, an apertured base member 3 is not required, as plant growth through the graveled "lawn" 41 is not desired.

A graveled "lawn" 41 is frequently laid over a sheet 43 of "geotextile", which is permeable to moisture, but too finely apertured to allow shoots and roots therethrough. Geotextile may lift up at its edges, which is unsightly and allows weeds to grow. If an edge support 1 is placed on top of the geotextile sheet 43 and is pegged into place with the pegs 12 extending through the sheet 43, the sheet 43 can be neatly maintained in position.

An edge support means as described above thus provides a convenient and reliable means of providing a neat and durable edge for a lawn, where it meets a flowering bed, a border or a pond. It can be used for straight, convex or concave edges with minimal adjustment. The lawn can be mown up to the edge with little risk of damage, and the lawn edge does not require frequent trimming, tidying and repair. The edge support can equally well be used to edge graveled garden areas as to edge traditional grassed lawns.

What is claimed is:

1. A curvable edge support means for a margin of a lawn, as defined herein, comprising an elongate generally L-shaped support member having an upstanding continuous wall part adapted to retain an edge of the lawn and provided along its upper margin with strengthening means; a base part disposable beneath the lawn and fixable to ground therebeneath; said base part comprising an elongate member provided along its margin remote from the wall part with strengthening means and an apertured lattice of strut members to connect the elongate member to the wall part, the lattice defining a plurality of elongate enclosed apertures, each elongate aperture extending substantially between the wall part and the elongate member and transversely to the wall part.

2. An edge support means as claimed in claim 1, wherein the elongate member extends substantially parallelly to the wall part.

3. An edge support means as claimed in claim 1, wherein the plurality of elongate apertures comprise at least one third of a total area of the base part.

4. An edge support means as claimed in claim 1, wherein the base part is provided with anchoring means.

5. An edge support means as claimed in claim 4, wherein the anchoring means comprises peg elements adapted to cooperate with apertures in the elongate member.

6. An edge support means as claimed in claim 1, wherein the elongate member is provided with a plurality of severable zones, any one of which may be severed as required to permit alteration, at any desired point, of the alignment of the wall part.

7. An edge support means as claimed in claim 6, wherein the wall part comprises zones of weakness adapted to facilitate its bending.

8. An edge support means as claimed in claim 1, wherein the strengthening means of the wall part comprises a flange member extending towards the base part.

9. An edge support means as claimed in claim 1, wherein the strengthening means of the base part comprises a flange member extending towards the wall part.

10. An edge support means as claimed in claim 1, provided with connection means to connect it to further edge support means.

11. An edge support means as claimed in claim 10, wherein the connection means is adapted to engage flange means of adjoining edge support means.

12. A method of protecting an edge of a lawn comprising the steps of providing an edge support means as claimed in claim 1, locating the base part thereof to a ground surface and so laying lawn material on top of the base part that an end of the lawn material abuts the wall part.

13. A method as claimed in claim 12, wherein the laying lawn material comprises laying turf.

14. A method as claimed in claim 12, wherein the laying lawn material comprises laying gravel.

15. A method as claimed in claim 12, comprising the step of removing existing lawn material from the lawn over at least an area corresponding to an extent of the base part.

16. A method as claimed in claim 12, comprising the step of peeling back existing lawn material over at least an area corresponding to an extent of the base part.

17. A method as claimed in claim 12, comprising the steps of providing a plurality of edge support means, and linking them in series before disposing them in position on the ground.

18. A method as claimed in claim 16, comprising the steps of providing a plurality of edge support means, and linking them in series after disposing them in position on the ground.

19. A method as claimed in claim 12, comprising the steps of digging a pond and laying a waterproof lining means over a base of the pond and a surface of the ground surrounding the pond, disposing the base part of the edge support means on top of said waterproof lining means, and laying thereon the lawn material.

20. A curvable edge support means for a margin of a lawn, as defined herein, comprising an elongate generally L-shaped support member having an upstanding continuous wall part adapted to retain an edge of the lawn and provided along its upper margin with strengthening means; a base part disposable beneath the lawn and fixable to ground therebeneath; said base part comprising an elongate member provided along its margin remote from the wall part with strengthening means and an apertured lattice of strut members to connect the elongate member to the wall part, the lattice defining a plurality of elongate apertures, each extending substantially between the wall part and the elongate member and transversely to the wall part; and the elongate member being provided with a plurality of severable zones, any one of which may be severed as required to permit alteration, at any desired point, of the alignment of the wall part.

21. An edge support means as claimed in claim 1, wherein the elongate member is coextensive with the wall part.

* * * * *